3,012,940
DERIVATIVES OF PREGNENE (18→11) LACTONES AND PHARMACEUTICAL COMPOSITIONS THEREOF
Albert Wettstein, Karl Heusler, and Peter Wieland, Basel, Switzerland, assignors to Ciba Pharmaceutical Products Inc., Summit, N.J.
No Drawing. Filed June 29, 1959, Ser. No. 823,357
Claims priority, application Switzerland July 1, 1958
23 Claims. (Cl. 167—65)

This invention provides new pregnan-18-acid derivatives oxygenated in 16-position and a process for their manufacture.

The adrenal cortex hormone aldosterone, which has the structure of a $\Delta^4$-3:18:20-trioxo-11$\beta$:21-dihydroxy-pregnene or a corresponding (18→11)-cyclosemiacetal, as is already known, exhibits an extraordinarily strong sodium-retaining effect. This effect is lost by small structural variations. Thus, for example, the (18→11)-lactone of $\Delta^4$-3:20-dioxo - 11$\beta$:21 - dihydroxy - pregnen-18-acid, easily obtainable from aldosterone 21-monoacetate by oxidation and hydrolysis exhibits no sodium-retaining action but on the contrary a slight sodium secreting effect. The present invention is based on the observation that this effect can be increased by multiple by the introduction of a 16$\alpha$-hydroxyl group, especially into the said lactone. On account of this effect, the 16$\alpha$-hydroxylated compounds described in this specification are thereapeutically applicable for the restoration of a disturbed sodium balance, especially in cases of retention of sodium, for example in oedemae, circulatory disorders, including high blood pressure.

The present invention provides inter alia a process for the manufacture of compounds of the formula

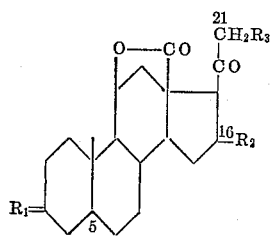

and their derivatives unsaturated in the ring A in which $R_1$ indicates a free or ketalised oxo group or a hydrogen atom together with a free or esterified hydroxyl group and $R_2$ and $R_3$ each indicates a free or esterified hydroxyl group. It consists in that in compounds of the above formula having no free or esterified hydroxyl group in one of the positions 16 and 21, such a group is introduced in a manner known per se.

According to the process of the invention a 16$\alpha$-hydroxyl group can be introduced for example by enzymatic oxidation, in which a starting material unsubstituted in 16-position is aerobically incubated with living microorganisms capable of introducing oxygen into the 16$\alpha$-position. It is also possible, however, to separate more or less the enzymes from the culture filtrate or the microorganisms and then to work in the absence of living microorganisms. The 16$\alpha$-hydroxylating microorganisms, for example Streptomyces sp. A 7747, *Streptomyces roseochromogenus*, *Didymella vodakii* and *Pestalotia funera*, are cultured in the manner known per se, for example in stationary or in submerged, agitated cultures, which advantageously contain assimilable carbon, for example carbohydrates. The simplest practical process is set out as follows, although others are possible: The organisms are cultured in apparatus and under similar conditions as are known in the manufacture of antibiotics in the so called deep tank process. After development of the cultures, the specified starting materials are introduced in fine dispersion or solution, for example in methanol, acetone or ethylene glycol and incubation is continued. Finally the mycelium is separated off and the filtrate and/or the mycelium mass extracted, and from the extract the reaction products isolated in a manner known per se, for example by partition processes, adsorption, chromatography, crystallisation, conversion into functional derivatives, such as Girard compounds and the like.

It is, however, also possible to prepare from 16:17-unsaturated compounds by oxidation with a peroxide compound, for example an organic per-acid such as perbenzoic acid or monoperphthalic acid or with hydrogen peroxide in alkaline solution, first a 16:17$\alpha$-epoxide and subsequently to split this up reductively to the 16$\alpha$-hydroxy compound. This splitting up can be carried out by two methods. One consists in that the 16$\alpha$:17$\alpha$-epoxide is treated with chromous chloride or acetate, whereby with reductive opening of the epoxide ring the 16$\alpha$-hydroxyl compound is obtained directly. By a further method, the 16$\alpha$:17$\alpha$-epoxide is reacted with an aryl hydrazine, advantageously in the presence of an acid catalyst, for example p-toluene sulphonic acid, the resulting $\Delta^{17(20)}$-16$\alpha$-hydroxy-20-arylazo-pregnene reduced, for example with zinc and glacial acetic acid in pyridine solution, to the 16$\alpha$-hydroxy-20-arylhydrazone and then the 20-oxo group liberated by hydrolysis, for example with pyroracemic acid and/or p-hydroxy-benzaldehyde.

On the other hand it is also possible to employ starting materials which already possess a free or esterified 16$\alpha$-hydroxyl group but in which the 21-oxygen function is lacking. Such compounds are described, for example in application Serial No. 823,356, filed June 29, 1959. In this case also the hydroxylation can be carried out by enzymatic oxidation with the use, in the above described manner, of enzymes of micro-organisms capable of introducing a hydroxyl group into the 21-position, for example *Ophiobolus herpotrichus* or microorganisms of the families Sphaeroidaceae, Sclerotinia, Wojnowicia or Hendersonia.

The 21-hydroxyl group can also be introduced by a chemical method in the manner known per se. For this purpose is suitable, for example, the condensation of a 21-unsubstituted pregnen-20-ketone with oxalic acid ester, followed by iodination, alkaline splitting, especially using potassium acetate and finally replacement of the 21-iodine atom for an acyloxy group by means of an alkali metal acylate for example sodium or potassium acetate. By this process the 21-monoacylates are obtained in a simple manner. Conversely, the 16-monoacylates can be produced for example from the 16:21-diacylates, produced in the customary manner from the free 16:21-dihydroxy compounds, by partial hydrolysis, for example with potassium bicarbonate in aqueous alcohol.

Then, if desired, a double bond in ring A can be saturated, for example by means of hydrogen in the presence of a noble metal catalyst, for example palladium on a carrier substance such as animal charcoal, calcium carbonate, barium sulfate or the like. In resulting 3-ketones this group can be reduced to the 3-hydroxyl group, for example by means of complex metal hydrides capable of leaving a lactone group unattacked, for example with sodium-boron hydride. Ketal groups present, for example an ethylene ketal in 3-position, can be split up to the ketone under the action of acids, for example dilute acetic acid in the hot. Likewise a 16$\alpha$, 21, and/or 3-hydroxyl group can be esterified in known manner. For this purpose reactive derivatives of saturated or unsaturated aliphatic or cycloaliphatic, aromatic or heterocyclic carboxylic acids are suitable, preferably of lower aliphatic, monocyclic cycloaliphatic, aromatic or heterocyclic carboxylic acids, lower monocyclic araliphatic or cycloaliphatic carboxylic acids, such as for example, those of formic acid, acetic acid, propionic acid, the butyric acids, valeric acids, such as n-valeric acid or trimethylacetic acid, the caproic acids such as β-trimethylpropionic acid, the enanthic, caprylic, pelargonic, capric or undecylic acids, for example undecylenic acid, the lauric, myristic, palmitic or stearic acids, for example oleic acid, cyclopentyl-, cyclohexyl- or phenyl- acetic acids or propionic acids, benzoic acid, phenoxy- alkanic acids, such as phenoxyacetic acid, p-chlorophenoxyacetic acid, 2:4-dichlorophenoxyacetic acid, 4-tertiary butyl-phenoxyacetic acid, 3-phenoxypropionic acid, 4-phenoxy-butyric acid, furan-2-carboxylic acid, 5-tertiary butyl-furan-2-carboxylic acid, 5-bromofuran-2-carboxylic acid, the nicotinic acids, or also of dicarboxylic acids, such as oxalic, succinic or glutaric acids, substituted carboxylic acids, such as β-keto-carboxylic acids, for example the acetoacetic, propionylacetic, butyrylacetic or caproylacetic acid, of amino acids and so on.

The products of the process of this invention are compounds of the formula

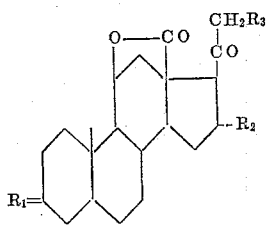

and their derivatives unsaturated in the ring A in which $R_1$ indicates a free or ketalised oxo group or a hydrogen atom together with a free or esterified hydroxyl group and $R_2$ and $R_3$ each indicates a free or esterified hydroxyl group.

The new compounds can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzylalcohols, gums, polyalkylene glycols, chloesterol or other known carriers. The pharmaceutical preparations can be in the form, for instance, of tablets or dragees or in liquid form as solutions, suspensions or emulsions. They may be sterilized and contain auxiliary substances, such as preserving, stabilizing, wetting or emulsifying agents, salts for the modification of osmotic pressure or buffers. They may also contain other therapeutically useful substances. The preparations are obtained in the customary way. The content of active substance in these preparations, such as of an ampoule, is preferably 0.1–200 mg., or 0.03–60%.

The following examples illustrate the invention:

Example 1

To a solution of 800 mg. of the (18→11)-lactone of $d:l$-$\Delta^5$-3-ethylenedioxy - 11β - hydroxy-16α:17α-oxido-20-oxo-21-acetoxy-pregnen-18-acid in 100 cc. of acetone is added with stirring in a stream of nitrogen first a solution of 7.2 grams of sodium acetate in 25 cc. of water and 5 cc. of glacial acetic acid and then a suspension of about 7.5 millimols of chromous acetate in 50 cc. of 80% acetone. After 21 hours stirring in a stream of nitrogen at room temperature, addition of 400 cc. of benzene, 200 cc. of water and 1 litre of saturated common salt solution and good shaking the aqueous phase is extracted twice further with 200 cc. of benzene. The organic solutions are then extracted with saturated common salt solution, 0.5 N sodium bicarbonate solution, saturated common salt solution and water, dried and evaporated under vacuum. The completely crystalline residue is dissolved in a benzene-chloroform mixture and chromatographed on 40 grams of silica gel. With benzene-ethyl acetate (1:1) mixture is eluted first the (18→11)-lactone of $d:l$-$\Delta^{5\cdot16}$-3-ethylenedioxy-11β-hydroxy-20-oxo-pregnadien-18-acid (93 mg.), while in the ethyl acetate fractions is found the (18→11)-lactone of $d:l$-$\Delta^5$-3-ethylenedioxy-11β:16α-dihydroxy-20-oxo-21-acetoxy-pregnen-18-acid, of which, after recrystallisation from methylene chloride-ether, 450 mg. are obtained. M.P. 243.5–245.5° C. (with decomposition). Infra-red spectrum (solvent: methylene chloride): 2.78μ (16-OH); 5.65μ with inflection at 5.68μ (γ-lactone+acetate); 5.77μ (20-ketone); 8.15μ (acetate) and 9.08μ (ketal).

The compound used as starting material can be produced as follows:

5.0 grams of the (18→11)-lactone of $d:l$-$\Delta^{5\cdot16}$-3-ethylenedioxy-11β-hydroxy-20-oxo-pregnadien-18-acid are dissolved in a mixture of 200 cc. of benzene and 600 cc. of methanol. To the solution, cooled to 0° C., are added 10 cc. of 4 N-sodium hydroxide solution and 20 cc. of 30% aqueous hydrogen peroxide and the reaction mixture is allowed to stand for 24 hours at 0° C. It is then poured into 2 litres of water and the whole extracted three times, with 1.5 litres of chloroform each time. The chloroform extracts are washed with water, combined, dried and evaporated. The crystallised residue (5.36 grams) is recrystallised from a mixture of methylene chloride and methanol. 5.03 grams are obtained of the (18→11)-lactone of $d:l$-$\Delta^5$-3-ethylenedioxy-11β-hydroxy-16α:17α-oxido-20-oxo-pregnen-18-acid of M.P. 272.5–275° C. The compound shows in the infra-red spectrum (methylene chloride solution) among others bands at: 5.65μ (γ-lactone); 5.85μ (20-CO); 9.10μ (3-ketal).

To 1 gram of dry sodium methylate is added with stirring and ice cooling in a stream of nitrogen a solution of 5.75 grams of oxalic acid dimethyl ester in 100 cc. of benzene. After five minutes stirring, addition of a solution of 4.3 grams of the (18→11)-lactone of $d:l$-$\Delta^5$-3-ethylenedioxy-11β-hydroxy-16α:17α-oxido-20 - oxo-pregnen-18-acid in 170 cc. of benzene with rinsing out with 40 cc. of benzene, the whole is stirred for three hours at an internal temperature of 3–6° C. and two hours after heating up to room temperature. 1.5 cc. of glacial acetic acid are then added followed by water and a methylene chloride-benzene mixture, the whole is shaken well and the aqueous phase is extracted twice further with benzene. After washing the organic solutions five times with water, drying and evaporation under vacuum, a crystalline light yellow residue is obtained which is heated to 60° C. under high vacuum for three hours for removal of oxalic acid dimethyl ester. Recrystallisation then takes place from a methylene chloride-ether mixture, whereby 5.08 grams of the (18→11)-lactone of $d:l$-$\Delta^5$-3-ethylenedioxy-11β-hydroxy - 16α:17α - oxido - 20-oxo-pregnen-18-acid-21-oxalo-acid methyl ester of M.P. 212.5–215.5° C. (with decomposition) are obtained. With ferric chloride a momentary red-brown coloration takes place. The infra-red spectrum taken in methylene chloride shows among others the following bands: 5.65μ (γ-lactone); 5.74μ (ester) and bands at 6.12μ and 6.28μ. 4.57 grams of this (18→11)-lactone of $\Delta^5$-3-ethylenedioxy-11β-hydroxy - 16α:17α - oxido - 20 - oxo-pregnen-18-acid-21-oxalo-acid methyl ester, 47.5 grams of dry potassium acetate and 180 cc. of methanol are stirred for three minutes with ice water cooling and then treated within 30 minutes with a solution of 2.39 grams of iodine in 50 cc. of absolute methanol with stirring and ice cooling. After-rinsing is then carried out with 10 cc. of methanol, the whole is left for four hours at 0° C. and then stirred for 30 minutes with cooling with an ice-common salt mixture. After filtration of the crystallised iodo-ketone and washing with 90%, 75% and 50% methanol, in each case at −10° C., the filter residue is dried for 45 minutes over sulfuric acid in a water jet vacuum. The filtrate, treated with 500 cc. of water and 300 grams of ice, is extracted four times with 75 cc. of methylene chloride each time. The combined methylene chloride extracts are washed three times with ice water, the wash water being itself then extracted twice with methylene chloride. All the methylene chloride solutions are then combined, dried and evaporated at a bath temperature of 20° C. in a water jet vacuum. The separate reaction of the resulting iodo-ketone from the mother liquors and the above described crystalline iodoketone with potassium acetate is carried out as follows: The iodo-ketone is rinsed with 275 cc. of acetone into a paste of potassium acetate prepared from 25 grams of potassium bicarbonate, 15 cc. of glacial acetic acid and 25 cc. of acetone and the whole is stirred over-night at room temperature and then boiled for 30 minutes under reflux. The reaction solution concentrated considerably under vacuum and diluted with water is then extracted by shaking three times with methylene chloride. The organic solutions are washed once with 0.1 N sodium bicarbonate solution and three times with water, after which they are dried and evaporated under vacuum. By recrystallisation of the reaction product from the crystalline iodo-ketone from an acetone-methylene chloride mixture, 2.83 grams are obtained of the (18→11)-lactone of $d:l$-$\Delta^5$-3-ethylenedioxy-11$\beta$-hydroxy-16$\alpha$:17$\alpha$-oxido-20-oxo-21-acetoxy-pregnen-18-acid of double melting point 214.5–221.5° C. and 242.5–246.5° C. The infrared spectrum taken in methylene chloride shows among others the following characteristic bands: 5.64$\mu$ ($\gamma$-lactone); 5.71$\mu$+8.18$\mu$ (acetate); 5.78$\mu$ (20-ketone) and 9.09$\mu$ (ketal).

The mother liquor from the ketolacetate is combined with the above obtained reaction product of the iodoketone from the mother liquors with potassium acetate, whereupon after 20 minutes drying at 70° C. in a water jet vacuum the residue is dissolved in 80 cc. of benzene and chromatographed on 10 grams of silica gel. With a benzene-ethyl acetate (4:1) mixture first 130 mg. of the oxalo-ester used as starting material are eluted, while from the benzene-ethyl acetate (7.5:2.5) fractions a further 500 mg. of ketol acetate are obtained.

*Example 2*

To a solution of 1.62 grams of the (18→11)-lactone of $d:l$-$\Delta^4$-3:20-dioxo-11$\beta$-hydroxy-16$\alpha$:17$\alpha$-oxido-21-acetoxy-pregnen-18-acid in 150 cc. of acetone is added with stirring in a stream of nitrogen a solution of 10 grams of sodium acetate in 37.5 cc. of water and 7.5 cc. of glacial acetic acid and then a suspension of about 15 millimols of chromous acetate in 75 cc. of 80% acetone. After 6 hours stirring in a stream of nitrogen, addition of 600 cc. of benzene, 1.5 litres of saturated common salt solution and 300 cc. of water and thorough shaking, the aqueous phase is extracted twice further with 300 cc. of benzene. The residue from the organic solutions after washing with 300 cc. of saturated common salt solution, 300 cc. of 5% sodium bicarbonate solution, 300 cc. of saturated common salt solution and 300 cc. of water, drying and evaporating under vacuum at 40° C. bath temperature is dissolved in 30 cc. of chloroform and 120 cc. of benzene and chromatographed on 80 grams of silica gel (containing 15% water). With benzene-ethyl acetate (4:1) and (7:3) mixtures there are first eluted 160 mg. of the (18→11)-lactone of $d:l$-$\Delta^{4,16}$-3:20-dioxo-11$\beta$-hydroxy-pregnadien-18-acid, while there is found in the fractions eluted with benzene-ethyl acetate (1:1) mixtures and with ethyl acetate the (18→11)-lactone of $d:l$-$\Delta^4$-3:20-dioxo-11$\beta$:16$\alpha$-dihydroxy-21-acetoxy-pregnen-18-acid, which after recrystallisation from a chloroform-alcohol mixture melts at 242–245.5° C. (with decomposition). The yield amounts to 930 mg. $\epsilon$ 238 m$\mu$=17500. Characteristic bands in the infra-red spectrum (pure liquid paraffin paste): 2.89$\mu$ (hydroxyl); 5.63$\mu$ ($\gamma$-lactone); 5.77$\mu$ with inflection at 5.81$\mu$ (acetate+20-CO); 5.99$\mu$+6.17$\mu$ ($\Delta^4$-3-ketone) and 8.12$\mu$ (acetate).

The same compound is also obtained by ketal splitting from the (18→11)-lactone of $d:l$-$\Delta^5$-3-ethylenedioxy-11$\beta$:16$\alpha$-dihydroxy-20-oxo-21-acetoxy-pregnen-18-acid described in Example 1: 410 mg. of this compound are heated with 10 cc. of 95% acetic acid in a nitrogen stream for 10 minutes to 100–105° C. By this means there is obtained, as shown by the infra-red and ultra-violet spectra, a ketal splitting product consisting of a mixture of $\Delta^4$- and $\Delta^5$-3-ketone. The displacement of the double bond from the 5-position to the 4-position takes place, however, in the following manner: 160 mg. of reaction product are dissolved in 6 cc. of chloroform and 3 cc. of alcohol and chromatographed on a mixture of 8 grams of Carboraffin and 16 grams of Celit. By elution with acetone and recrystallisation of the eluates from a chloroform-alcohol-acetone mixture, 122 mg. are obtained of the (18→11)-lactone of $d:l$-$\Delta^4$-3:20-dioxo-11$\beta$:16$\alpha$-dihydroxy-21-acetoxy-pregnen-18-acid, of which the infra-red and ultra-violet spectra are identical with those of the above described preparation.

By hydrolysis in methanol-aqueous solution with potassium bicarbonate at room temperature there is obtained the (18→11)-lactone of $d:l$-$\Delta^4$-3:20-dioxo-11$\beta$:16$\alpha$:21-tri-hydroxy-pregnen-18-acid.

The (18→11)-lactone of $d:l$-$\Delta^4$-3:20-dioxo-11$\beta$-hydroxy-16$\alpha$:17$\alpha$-oxido-21-acetoxy-pregnen-18-acid used in this example as starting material can be prepared as follows from the (18→11)-lactone of $d:l$-$\Delta^5$-3-ethylenedioxy-11$\beta$-hydroxy-16$\alpha$-17$\alpha$-oxido-20-oxo-21-acetoxy-pregnen-18-acid described in Example 1: 2.0 grams of this compound are heated with 20 cc. of glacial acetic acid in a bath at 100° C. with passage of nitrogen until a clear solution is produced. 20 cc. of hot water are then added, the whole left for a further 20 minutes in the bath at 100° C. and again treated with 20 cc. of hot water whereby crystallisation takes place. Cooling to −12° C. is then carried out followed by filtration and washing with water and ether. 1.63 grams are obtained of the (18→11)-lactone of $d:l$-$\Delta^4$-3:20-dioxo-11$\beta$-hydroxy-16$\alpha$:17-oxido-21-acetoxy-pregnen-18-acid, which after another recrystallisation from methylene chloride-ether melts at 277–282° C. (with decomposition). By working up the aqueous-acetic acid mother liquor, a further 127 mg. of the specified lactone are obtained. Infra-red spectrum (solvent:methylene chloride): among others bands at 5.65$\mu$($\gamma$-lactone); 5.72$\mu$+8.18$\mu$(acetate); 5.79$\mu$(20-ketone) and 5.99$\mu$+6.18$\mu$($\Delta^4$-3-ketone). Ultra-violet spectrum: $\epsilon$ 238m$\mu$=16900.

*Example 3*

In 3 conical flasks each of 500 cc. capacity, portions of 100 cc. of beer wort are sterilised and inoculated with *Pestalotia funera*. The flasks are shaken at 25° C. as a result of which the cultures are well developed within 2 days. There is now added to each under sterile conditions a suspension of 30 mg. of the (18→11)-lactone of $\Delta^4$-3:20-dioxo-11$\beta$:21-dihydroxy-pregnen-18-acid and the whole is shaken for a further 48 hours at the same temperature. The mycelium is separated off and the combined culture filtrate is extracted three times in each case with 100 cc. of ethyl acetate. The extracts are washed with a little water, combined, dried and evaporated under vacuum. Paper chromatographic examination of the residue (145 mg.) shows a zone over the same distance as the (18→11)-lactone of $d:l$-$\Delta^4$-3:20-dioxo-11$\beta$:16$\alpha$:21-trihydroxy-pregnen-18-acid described in Example 2. By elution of this zone with aqueous tetrahydro-furan, the 16$\alpha$-hydroxy compound can be isolated in pure form.

In an analogous manner there is produced by the addition of the above mentioned starting material to a culture of Streptomyces sp. A 7747 or *Streptomyces roseochromogenus* the (18→11)-lactone of $\Delta^4$-3:20-dioxo- 11β:16α:21-trihydroxy-pregnen-18-acid. As culture medium there is used a nutrient solution containing in 1000 cc. 10 grams of crude glucose, 5 grams of peptone, 3 grams of meat extract (Oxo Lab Lemco), 5 grams of common salt and 10 grams of calcium carbonate.

*Example 4*

4 liters of 70% beer wort are sterilised and inoculated with a culture of *Ophiobolus herbotrichus*. After 3 days' shaking there is added to the well developed culture a sterile suspension of 100 mg. of the (18→11)-lactone of Δ⁴-3:20-dioxo-11β:16α-dihydroxy-pregnen-18-acid in 2.5 cc. of acetone and shaking is continued for a further four days at 26° C. The mycelium is then separated and the culture filtrate extracted three times with 100 cc. of ethyl acetate each time. The ethyl acetate extracts are washed with 0.1 N hydrochloric acid, 0.1 N sodium bicarbonate solution and water, combined, dried and evaporated under vacuum. The residue (120 mg.) is analysed as described in Example 3 and separated on paper. From the zone occupying a similar region to the compound described in Example 2 there is obtained the pure (18→11)-lactone of Δ⁴-3:20-dioxo-11β:16α:21-trihydroxy-pregnen-18-acid.

Instead of *Ophiobolus herbotrichus* there can also be used cultures of micro-organisms of the families Sphaeroidaceae, Schlerotinia, Wojnovicia or Hendersonia.

What is claimed is:
1. The (18→11)-lactone of Δ⁵-3-ethylene-dioxy-11β:16α:21-trihydroxy-20-oxo-pregnen-18-acid.
2. A 16:21-diester of the compound claimed in claim 1.
3. A 16α-ester of the compound claimed in claim 1.
4. A 21-ester of the compound claimed in claim 1.
5. The (18→11)-lactone of Δ⁵-3-ethylene-dioxy-11β:16α-dihydroxy-20-oxo-21-acetoxy-pregnen-18-acid.
6. The (18→11)-lactone of Δ⁴-3:20-dioxo-11β:16α:21-trihydroxy-pregnen-18-acid.
7. A 16α:21-diester of the compound claimed in claim 6.
8. A 16α-ester of the compound claimed in claim 6.
9. A 21-ester of the compound claimed in claim 6.
10. The (18→11)-lactone of Δ⁴-3:20-dioxo-11β:16α-dihydroxy-21-acetoxy-pregnen-18-acid.
11. The (18→11)-lactone of Δ⁵-3-ethylene-dioxy-11β:21-dihydroxy-16α:17α-oxido-20-oxo-pregnen-18-acid.
12. A 21-ester of the compound claimed in claim 11.
13. The (18→11)-lactone of Δ⁴-3:20-dioxo-11β:21-dihydroxy-16α:17α-oxido-pregnen-18-acid.
14. A 21-ester of the compound claimed in claim 13.
15. The (18→11)-lactone of Δ⁵-3-ethylene-dioxy-11β-hydroxy-16α-17α-oxido-20-oxo-21-acetoxy-pregnen-18-acid.
16. The (18→11)-lactone of Δ⁴-3:20-dioxo-11β-hydroxy-16α-17α-oxido-21-acetoxy-pregnan-18-acid.
17. The (18→11)-lactone of Δ⁵-3-ethylene-dioxy-11β-hydroxy-16α:17α-oxido-20-oxo-21-iodo-pregnen-18-acid.
18. A compound selected from the group consisting of a compound of the formula:

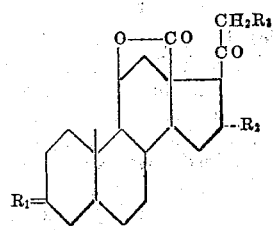

and derivatives thereof unsaturated in one of the positions 4:5 and 5:6, in which formula $R_1$ stands for an oxo group, said oxo group being ethylenedioxy-ketalized when unsaturation is present in the 5:6-position and $R_2$ and $R_3$ each for a member selected from the group consisting of a free and esterified hydroxyl group.

19. A pharmaceutical composition comprising a compound of claim 18 containing the active ingredient in an amount ranging from 0.03–60% together with a suitable pharmaceutical carrier.
20. A pharmaceutical composition as claimed in claim 19, containing the active ingredient in an amount ranging from 0.03–60% together with a suitable pharmaceutical carrier in the form of a tablet.
21. A pharmaceutical composition as claimed in claim 19, containing the active ingredient in an amount ranging from 0.03–60% together with a suitable pharmaceutical carrier in the form of an oil ampoule.
22. A pharmaceutical composition as claimed in claim 19, containing the active ingredient in an amount ranging from 0.03–60% together with a suitable pharmaceutical carrier in the form of an ampoule containing an aqueous solution.
23. A compound selected from the group consisting of a compound of the formula:

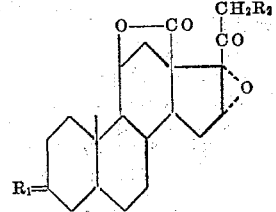

and derivatives thereof unsaturated in one of the positions 4:5 and 5:6, in which formula $R_1$ stands for a member selected from the group consisting of an oxo group

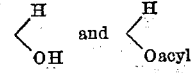

said oxo group being ethylenedioxy ketalized when unsaturation is present in 5:6 position, and $R_2$ for a member selected from the group consisting of a free, an esterified hydroxyl group and an iodine atom.

References Cited in the file of this patent
UNITED STATES PATENTS 2,841,531 Wettstein et al. _____ July 1, 1958
2,844,513 Wettstein et al. _____ July 22, 1958